United States Patent [19]

Culver

[11] 4,168,428
[45] Sep. 18, 1979

[54] SYNC TRANSMISSION METHOD AND APPARATUS FOR HIGH FREQUENCY PULSED NEUTRON SPECTRAL ANALYSIS SYSTEMS

[75] Inventor: Richard B. Culver, Houston, Tex.

[73] Assignee: Dresser Industries, Inc., Dallas, Tex.

[21] Appl. No.: 815,490

[22] Filed: Jul. 14, 1977

[51] Int. Cl.² ............................................. G01V 5/00
[52] U.S. Cl. .................................... 250/263; 250/270
[58] Field of Search ............... 250/263, 262, 269, 270; 340/18 P; 181/102, 103

[56] References Cited

U.S. PATENT DOCUMENTS

| | | | |
|---|---|---|---|
| 3,739,172 | 6/1973 | Culver | 250/261 |
| 4,013,874 | 3/1977 | Culver | 235/92 PC |

*Primary Examiner*—Alfred E. Smith
*Assistant Examiner*—Janice A. Howell
*Attorney, Agent, or Firm*—Robert W. Mayer

[57] ABSTRACT

A pulsed neutron generator in a well logging instrument is pulsed at a clock frequency of 20 KHz. Inelastic scatter gamma rays are detected during a first time interval coinciding with the neutron source being on and capture gamma rays are measured during a second interval subsequent to the end of each neutron burst. Only a single detected pulse, assuming detection occurs, is transmitted during each of the two detection intervals. Sync pulses are generated in the well logging instrument scaled down to a frequency of 200 Hz for transmission to the earth's surface. At the earth's surface, the scaled-down sync pulses are applied to a phase locked loop system for regenerating the sync pulses to the same frequency as that of the clock frequency used to pulse the neutron source and to open the detection gates in the borehole instrument. The regenerated sync pulses are used in the surface instrumentation to route the pulses occurring in the inelastic interval into one section of a multichannel analyzer memory and the pulses occurring in the capture interval into another section of the multichannel analyzer. The use of memory address decoders, subtractors and ratio circuits enables both a carbon/oxygen ratio and a silicon/calcium ratio to be struck substantially free of background radiation.

8 Claims, 9 Drawing Figures

SYNC TRANSMISSION METHOD AND APPARATUS FOR HIGH FREQUENCY PULSED NEUTRON SPECTRAL ANALYSIS SYSTEMS

BACKGROUND OF THE INVENTION

This invention relates generally to radiological well logging methods and apparatus for investigating the subsurface earth formations traversed by a borehole and, more specifically, relates to an improved synchronization system for high frequency pulsed neutron gamma ray logging methods and apparatus wherein gamma rays resulting from neutron inelastic scattering and thermal neutron capture are selectively detected and the spectral distribution of the gamma rays is determined.

The selective detection of characteristic gamma rays emanating from earth elements undergoing meutron bombardment is appreciated by those skilled in the art as a method for identifying such elements. More specifically, the detection of gamma rays from carbon, oxygen, silicon, calcium and certain other elements enables the identification of the general rock types in formations traversed by boreholes and the determination of the presence or absence of hydrocarbons within their pore spaces. To identify these elements, both high and low energy reactions must be detected; thus, the neutron source must be pulsed and measurements made during the neutron burst when high energy reactions occur and between bursts when thermal capture reactions occur. Hence, the detector and neutron source must be synchronized.

In well logging applications, the neutron source and detector in the subsurface instrument are connected to the surface analyzing and recording equipment by 20,000 or more feet of cable which carries power, control and detector signals. Since the amplitude of the detector pulses varies in proportion to the energy of the detected gamma rays, the logging cable must not significantly degrade the energy resolution of the system. The seven-conductor cables which are widely used in the well logging industry have been found to be generally acceptable for gamma ray spectral analysis despite their poor high frequency response. The detector and sync pulses applied to the surface end of the logging cable are widened during their transit over the line and are several microseconds wide when they reach the surface end of the cable. Typically, a unipolar pulse which is two to three microseconds wide at the subsurface end of a 20,000 foot cable will be 10 to 12 microseconds wide at the surface end. While this time spreading is of little significance at low source pulsing frequencies, it does place an upper limit on the usable source pulsing frequency if a synchronization pulse is transmitted each time the source is pulsed. Furthermore, it should be appreciated that a high pulsing frequency is desirable for the inelastic detection systems in order to obtain the counting rates appropriate for good statistical accuracy. Since the pulses are spread in time by their transit over the logging cable, there is a greater probability of pulse pile-up on the line than in the gamma ray detector itself. In order to eliminate detector pulse pile-up on the line, it has already been found desirable to incorporate the circuit described in my U.S. Pat. No. 3,739,172 which allows only one pulse per gate interval to be fed to the cable for transmission to the surface. Such a circuit allows a pulse which occurs as late as 100 nanoseconds before the end of the gating interval to be transmitted as a full width pulse.

By example, if a 10 microsecond wide neutron burst and a 10 microsecond wide inelastic detector gate are used with a 10 microsecond wide capture gate in a system pulsed at 20 KHz, there is little time left in the repetition period for a sync pulse to be transmitted. This is because the detector pulses from a particular detector gate fall within a 20 to 22 microsecond wide interval at the receiving end of the cable. This time is the sum of the 10 microsecond wide detector gate and the 10 to 12 microsecond wide pulses received at the surface since the pulse may well occur right at the end of the detector gate interval. With lines shorter than 20,000 feet, the time spreading is correspondingly less.

To use these neutron bursts and detector gate widths and allow a small safety margin against coincidence, it would be necessary to increase the pulsing and detection period to about 60 microseconds. Since one of the problems with inelastic gamma ray well logging systems is that of obtaining sufficient counting rates to produce a statistically accurate measurement, it is desirable to operate at the higher pulsing frequency, for example, 20 KHz, having a pulsing and detection period of 50 microseconds.

It is therefore the primary object of this invention to extend the upper limit on the usable source pulsing frequency in a pulsed neutron logging system.

It is also an object of the invention to provide a new and improved method and apparatus for transmitting sync pulses to the earth's surface in well logging systems.

The objects of the invention are accomplished, generally, by method and apparatus which operate within the borehole instrument at a given clock frequency but which generate and transmit sync pulses at a frequency lower than said given clock frequency and which then regenerate at the earth's surface the sync frequency to the original clock frequency to be used in conjunction with the signals of interest.

These and other objects, features and advantages of the present invention will be more readily understood by those skilled in the art from a reading of the following detailed specification and drawing, in which:

FIG. 1 is a side elevation, partly in cross section, of a borehole logging instrument in operative position and its associated surface circuitry and related equipment;

FIG. 2 schematically illustrates, in cross section, a seven-conductor well logging cable;

Figures 1, 2:
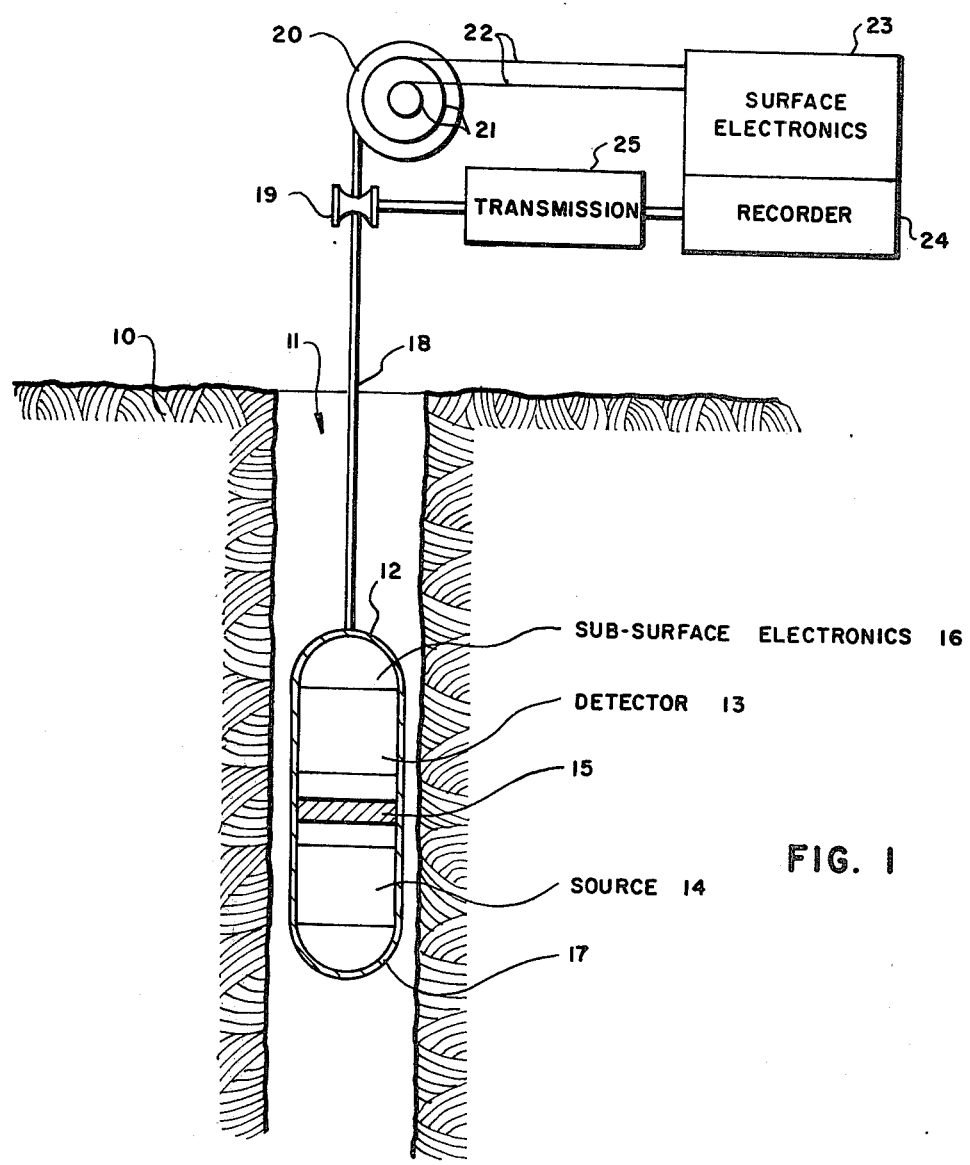

Referring now to the drawing in more detail, particularly to FIG. 1, there is illustrated schematically a radioactivity well surveying operation in which a portion of the earth 10 is shown in vertical section. A well 11 penetrates the earth's surface and may or may not be cased. Disposed within the well is subsurface instrument 12 of the well logging system. Subsurface instrument 12 comprises a detecting system 13 and a pulsed neutron source 14. Cable 18 suspends the instrument in the well and contains the required conductors for electrically connecting the instrument with the surface apparatus. The cable is wound on or unwound from drum 20 in raising and lowering the instrument 12 to traverse the well.

In making a radioactivity log of the well, instrument 12 is caused to traverse the well. Thereby neutrons from source 14 irradiate the formations surrounding the borehole and radiations influenced by the formations are detected by the detecting system 13. The resultant signals are sent to the surface through cable 18. Through slip rings 21 on the end of the drum, the signals are conducted to the surface electronics 23, where such signals are processed and then recorded on the recorder 24 as explained in more detail hereinafter. Recorder 24 is driven through a transmission 25 by measuring reel 19 over which the cable 18 is drawn so that recorder 24 moves in correlation with depth as the instrument 12 traverses the well. The elements are shown diagrammatically, and it is to be understood that the associated circuits and power supplies are provided in a conventional manner. It is also to be understood that the instrument housing 17 will be constructed to withstand the pressures and mechanical and thermal abuses encountered in logging a deep well and provide adequate space within it to house the necessary apparatus and permit the transmission of radiation through it. The subsurface signals are processed in the subsurface electronics 16, described in greater detail hereinafter, and after surface signals are taken off the slip rings 21, they are sent to the surface electronics 23 by means of the conductors 22.

In FIG. 2, there is illustrated a conventional seven-conductor logging cable 18 which normally has a central conductor 31 around which six additional conductors 30 are wrapped. The conductors 30 are covered by an insulation sheath 32 and by an outer armor 33 for mechanical strength.

In well logging operation such as is illustrated by the apparatus of FIG. 1, the neutron source and detector in the subsurface instrument 12 are separated from the surface processing and recording equipment 23 by as much as four to five miles of logging cable which carries power and signals. Synchronization pulses must be transmitted along with the detector signals to provide the means for synchronizing the surface processing equipment with the subsurface generating and detecting system. Those skilled in the art recognize the advantages of using a multi-conductor cable such as is illustrated in FIG. 2 for interconnection with the subsurface and surface instruments, particularly with systems for induction-electric and accoustic measurements. It is also desirable to use such cables with pulsed neutron spectral analysis systems, and since the frequence response of the outer conductors 30 is poorer than that of the inner conductor 31, it has been found to be convenient to use the center conductor for signal transmission and the outer conductors for power and control lines.

The sync pulse received at the surface of the 20,000 odd feet of logging cable commonly encountered in the well logging industry has a width of about ten microseconds due to the poor high frequency response of the cable. At low repetition frequencies, for example, 2,000 Hz or less, the transmission of a sync pulse for each neutron burst is not particularly difficult; however, at high repetition rates, for example, 20 KHz, the sync pulse represents an appreciable amount of the repetition period. If, however, the sync pulses are scaled and transmitted only one or two percent of the time, a significant improvement in accordance with the present invention results since the sync is regenerated at the surface by use of a phase coherent, phase-locked loop.

Figure 3:
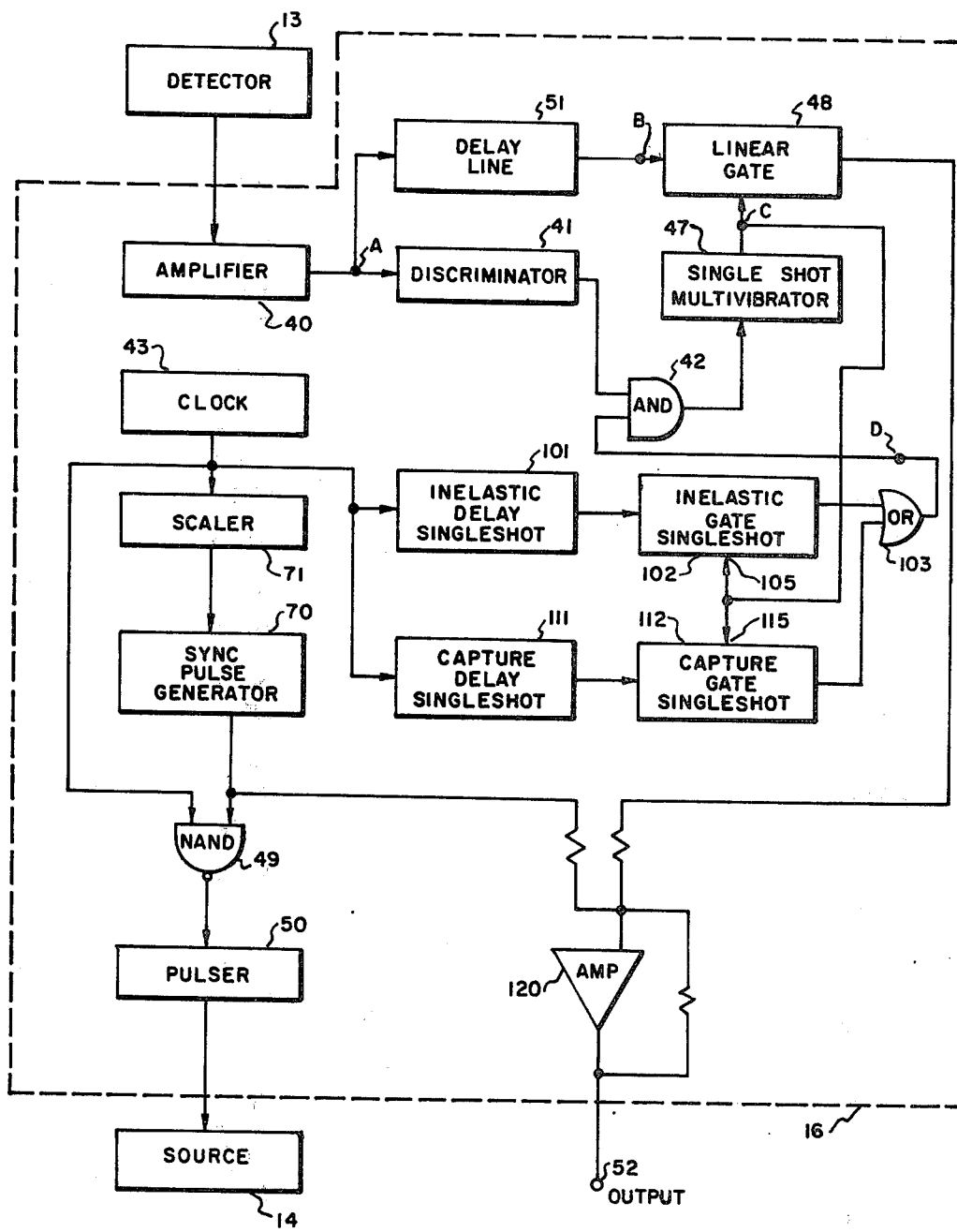
FIG. 3 is a block diagram of the subsurface circuitry according to the present invention.

FIG. 3 illustrates the subsurface apparatus and circuitry for generating the neutron source signals, the radioactivity detector signals, and the scaled sync signals for transmission to the earth's surface.

Referring now to FIG. 3, there is illustrated in block diagram the subsurface electronics section 16, as connected to the detector 13. The detector 13 is a scintillation counter arranged for gamma ray spectral analysis in accordance with the prior art. In a preferred embodiment, it is a NaI (Tl) crystal having a 2½ inch diameter with a 4 inch length, such crystal being coupled to a Model No. 4523 photomultiplier tube available from The Radio Corporation of America. Such a crystal-photomultiplier combination may have a resolution of 7.5% to 8.5% for the 660 kev cesium 137 peak. The detector is mounted in a Dewar flask or is otherwise protected from high temperatures encountered in boreholes. The output of the detector 13 combination is coupled into an amplifier 40 within the subsurface electronics section 16. The output of amplifier 40 is coupled to a discriminator 41 which in turn is coupled into one of the two inputs of the AND gate 42. The discriminator 41 is used to remove pulses having amplitudes below a selectable threshold value which might otherwise cause pile-up on the transmission line normally connected to the output terminal 52. A setting of 400 kev is generally suitable for this purpose. The output of the discriminator 41 is AND gated in the AND gate 42 with a voltage pulse having a nominal width of ten microseconds from the OR gate 103. The output of the AND gate 42 triggers the single shot multivibrator circuit 47 which is nominally set to have a 1.6 microsecond wide pulse output for controlling the linear gate 48. The output from clock 43 triggers the inelastic delay single shot multivibrator circuit 101 which in turn triggers the inelastic gate width single short multivibrator circuit 102. These circuits synchronize the opening of linear gate 48 with the pulsing of the neutron source to provide the inelastic gating interval. Multivibrator 102 is a retriggerable type with a "clear" input 105. The operation of the circuit is such that if a trigger pulse is applied before the end of the cycle initiated by a previous trigger pulse, the cycle time will begin anew. Also, after the circuit is initiated by a trigger pulse, the Q output will remain high until the end of the cycle time or until a "clear" pulse is applied, whichever occurs first. The output of single shot 102 is coupled to one input of OR gate 103. The "clear" input 105 of single shot 102 is driven by the output of single shot 47. The result of this "clear" signal is to reset inelastic gate single shot 102 as soon as the first gamma ray with energy above the discriminator threshold is detected. By using a multivibrator circuit with a "clear" function for gate single shot 102, a dual function is performed. Firstly, the single shot provides the gate width timing signal for determining the maximum length of the inelastic detection gate, nominally 10 μsec; and secondly, it provides for terminating the gate when the first gamma ray pulse above the discriminator threshold is detected, a function performed by a J-K flip-flop in my U.S. Pat. No. 3,739,172.

The output from clock 43 is also connected to capture delay single shot 111 which in turn drives capture width single shot 112 which also has a "clear" input and whose output is coupled to the second input of OR gate 103. The "clear" input terminal 115 of single shot 112 is also driven by the output of single shot 47. The clock 43 is also synchronized with the neutron source 14. The pulse from the clock 43 actuates, by means of a NAND circuit 49, a high voltage pulser 50 arranged to cause the neutron output of source 14 to pulse at the clock frequency as described in U.S. Pat. No. 3,309,522.

The amplified pulses from the amplifier 40 are also coupled into a delay line 51, which is nominally set to cause a delay of 0.4 microseconds, the output of which is coupled into the linear gate 48.

The output of the clock circuit 43 is also coupled into a scaler circuit 71 which produces output pulses at a frequency scaled down from that of the clock frequency. In the preferred embodiment, the clock 43 operates at a frequency of 20 KHz and the scaler circuit 71 produces pulses at a frequency of 200 Hz. The output of the scaler 71 is coupled to a sync pulse generator 70 which shapes the pulses for application to the line amplifier 120 and NAND gate 49. Thus, the scaled sync pulses are generated at a frequency which is 1% of that of the clock frequency 43. The scaled sync pulses from the sync pulse generator 70 are coupled into the second input of the NAND gate 42. Thus, whenever a sync pulse appears on the NAND gate 49 input coincident with a pulse from the clock circuit 43, there is no output produced from the NAND gate 49 and the neutron source 14 is not pulsed. In short, the source 14 pulses every time the clock 43 pulses except for those times when the scaled sync pulses are produced.

In addition to the scaled sync pulses, the output from linear gate 48 is coupled to the line amplifier 120 which in turn is coupled to line 18 by connection to terminal 52.

In the operation of the circuitry of FIG. 3, it should be readily apparent that the circuitry involved with the single shot 111 and the single shot 112 are duplicates of the circuitry involving the single shot 101 and the single shot 102. The difference lies in the time constant of each circuit which allows there to be two gating intervals which are separated in the preferred embodiment by a delay of 25 microseconds from the beginning of the first to the beginning of the second. As will be explained hereinafter, the first gating interval occurs during the time the neutron source is turned on and allows for the detection of radioactivity resulting from inelastic scattering and the second gating interval allows for the measurement of neutron capture resulting from the pulsing of the neutron source.

Figure 9:
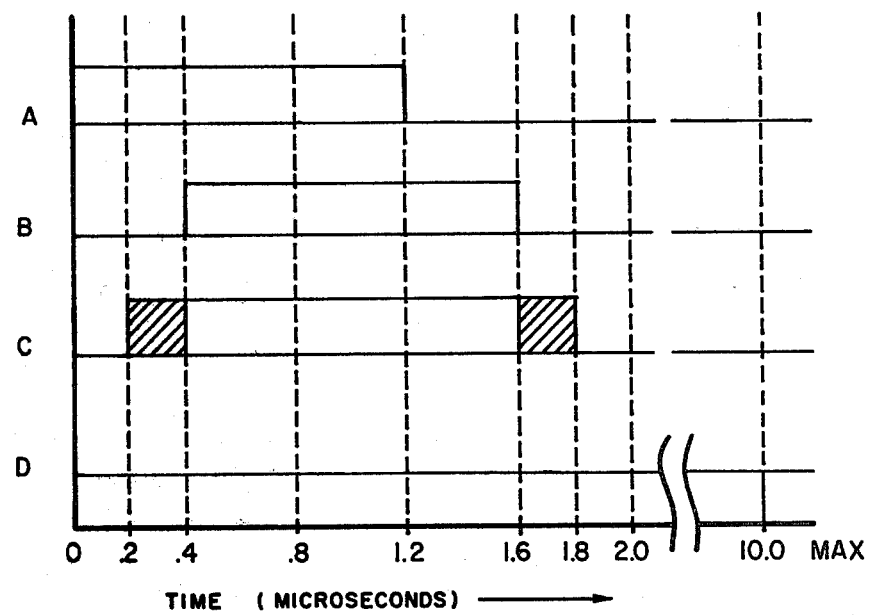

The operation of the portion of the circuitry of FIG. 3 utilizing the discriminator 41, the delay circuit 51, and the resettable single shot circuit 102 can best be explained by reference to FIG. 9, wherein various waveforms appearing in that portion of the circuitry of FIG. 3 are graphically illustrated. In FIGS. 3 and 9, the pulse appearing at point A, having a duration of 1.2 microseconds, is representative of the output of the amplifier 40. The pulse appearing at point B is representative of the output of the delay line 51. The point C is representative of the output of the single shot multivibrator 47. The point D is representative of the output from OR gate 103. It should be appreciated from observing the pulse waveforms of FIG. 9 that the linear gate 48 is open approximately 200 nanoseconds before the arrival of the detector pulse and closes about 200 nanoseconds after the detector pulse passes through the linear gate 48. The 200 nanosecond factor is shown by the cross-hatched areas on the waveform of point C in FIG. 9. It should also be appreciated that the first detector pulse exceeding the threshold of the discriminator 41 and commencing within the time interval of the gate pulse from the OR gate 103 is passed by the linear gate 48 to the amplifier 120. It should also be appreciated that by AND gating the 10 microsecond pulse from the OR gate with the discriminator output to provide the trigger for the single shot multivibrator which in turn controls the opening of the linear gate, rather than triggering the single shot multivibrator from the discriminator and gating the single shot multivibrator output and the OR gate pulse for the linear gate control signal, a detector pulse occurring near the end of the clock pulse interval is passed as a full width pulse instead of being chopped off as would otherwise occur. It should also be appreciated that the single shot 102 is reset on the leading edge of the output pulse from single shot 47, disabling AND gate 42. Thus, the first, and only the first, detector pulse occurring during the interval determined by single shot 102 is passed by the linear gate 48. Again, the pulse output from the linear gate 48 is full width, even should it occur late within the clock interval.

As hereinabove set forth, the circuitry associated with the second gating interval, i.e., the discriminator 41, the delay line 51 and the single shot circuit 111, etc., etc., operates in a substantially identical manner with that above described except the delay of circuit 111, having a nominal time constant of 25 microseconds, enables the neutron capture radiation to be detected but again only a single pulse is passed occurring within the 10 microsecond gate interval determined by single shot 112. These pulses are passed through the linear gate 48 to the amplifier 120 and the pulse output from the linear gate 48 again is full width, even should it occur late within the gate interval.

Figure 6:
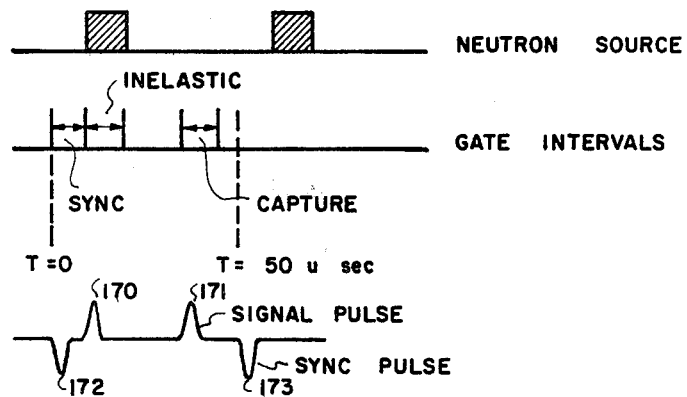
FIGS. 6, 7, 8 and 9 schematically illustrate waveforms representative of the various signals appearing in the surface and subsurface circuitry in accordance with the present invention.
Figure 7:
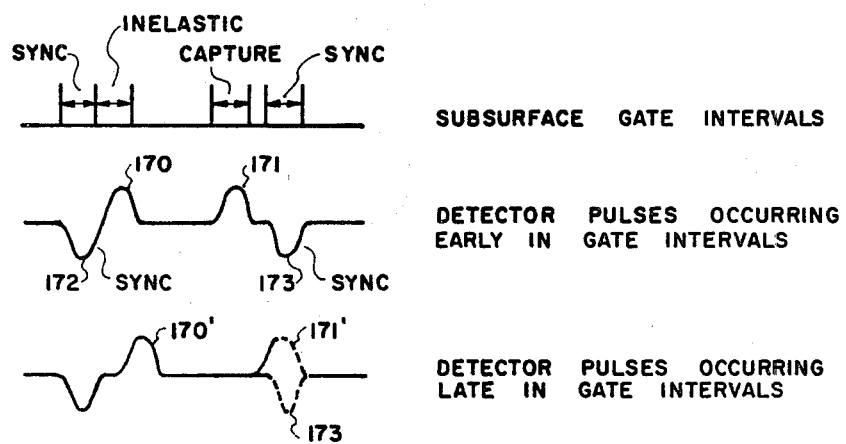

The diagrams shown in FIGS. 6 and 7 are exemplary of the relationship of the neutron source pulses, the gate intervals and the detected pulses occurring during the gate intervals. In FIG. 6, the inelastic gate interval occurs during the time the neutron source is turned on and the capture interval, being nominally 10 microseconds long, commences 15 microseconds after the termination of the inelastic gating interval. In FIG. 6, the detector pulse 170 is indicative of inelastic scattering which is detected during the inelastic gate interval and the pulse 171 is indicative of neutron capture occurring during the capture gate interval. The sync pulses 172 and 173 can be made to occur during the 10 microseconds preceding the neutron source being turned on if desired and, when so done, will occur as illustrated in FIG. 6. However, as illustrated in FIG. 7, the pulses are stretched out, as compared to the narrow pulses illustrated in FIG. 6, after they reach the earth's surface over the long logging cable. Thus, with the high frequency use, the sync pulses 172 and 173 can easily interfere with the detected pulses 170 and 171. This is especially true when the detector pulses occur late within the gate interval such as illustrated by the numerals 170' and 171'. As shown by the dotted line portion, the detector pulse 171' coincides in time with a portion of the sync pulse 173 and one of two things happens. If the sync pulse is of opposite polarity, the two pulses tend to cancel out, and if the sync pulse is of the same polarity (not illustrated), such random coincidences will only add to the amplitude of the sync pulses. Thus, it becomes quite difficult when using such circuitry to avoid interference between the sync pulses and the detected pulses.

Figure 4:
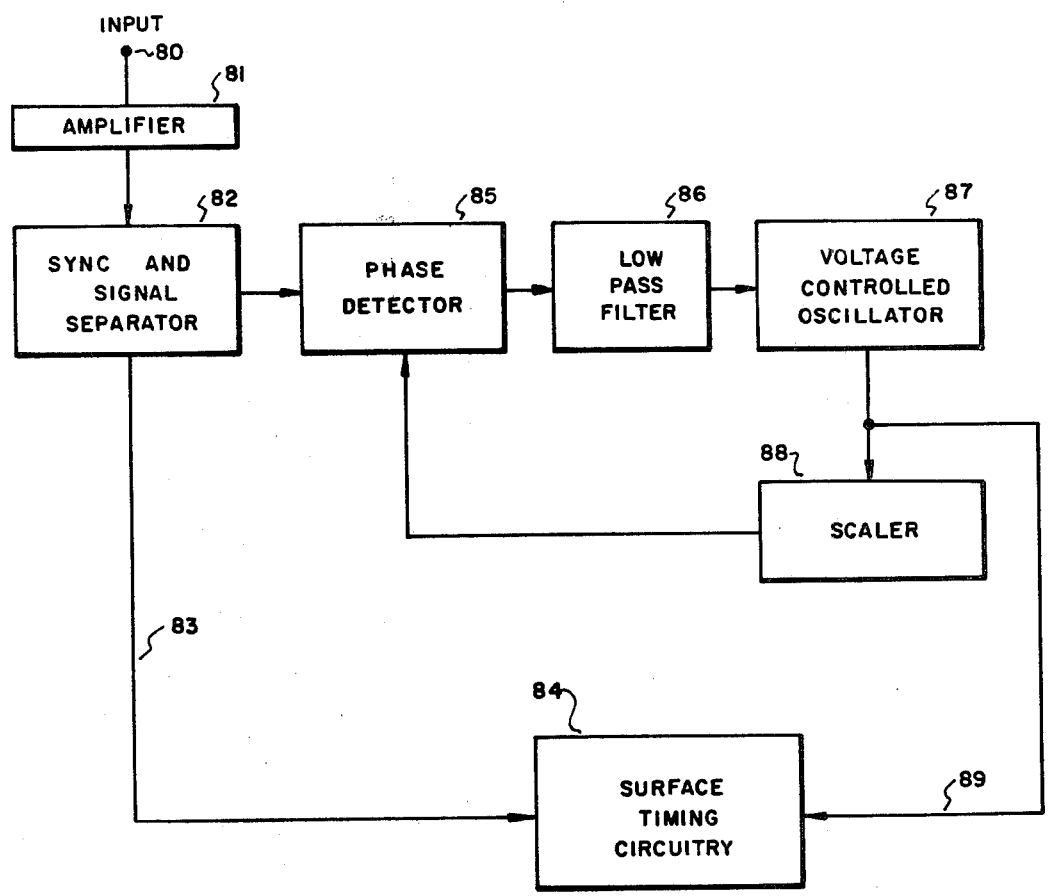
FIG. 4 is a block diagram of the surface circuitry according to the present invention.

Referring now to FIG. 4, the surface electronics circuitry 23 is illustrated in greater detail. The input terminal 80 in the surface electronics 23 which receives the pulses from the logging cable is coupled into an amplifier 81 whose output is coupled into a conventional sync and signal separator circuit 82. Quite obviously, if the sync and signal pulses are of opposite polarity, they can be separated by polarity-sensitive circuitry and if they are of the same polarity, they can be separated by a voltage discriminator circuit well known in the art. The preferred embodiment contemplates that the sync is transmitted with a polarity opposite from that of the detected pulses and the neutron source is not pulsed during the scaled sync transmission interval so that random coincidences do not annihilate the sync. If desired, the detector gate intervals can also be gated off during the sync transmission interval. The detector signals are coupled out of the sync and signal separator by conductor 83 into the surface timing circuitry 84 which is described in greater detail hereinafter.

The sync pulses from the sync and signal separator circuit 83 are coupled into a phase detector circuit 85, the output of which is coupled into a low pass filter 86 and then into a voltage controlled oscillator 87. The output of the voltage controlled oscillator 87 is coupled into a scaler 88 and also into the surface timing circuitry 84 by conductor 89. The output of the scaler circuit 88 is coupled back into phase detector circuit 85.

In the operation of the circuitry of FIG. 4, the combined sync and signal pulses are fed into the sync separator 82 where the sync pulses are separated and shaped to provide a reference frequency for the phase detector circuit 85. The phase detector output is filtered and used as the controlling voltage for the voltage controlled oscillator. The oscillator output is scaled by a frequency divider and fed to the second input of the phase detector circuit 85. When the loop is in lock, the voltage controlled oscillator output frequency is equal to the product of the reference input frequency and the scaler ratio. Thus, if the subsurface system runs at a clock frequency of 20 KHz and the sync pulses are scaled and transmitted at a 200 Hz rate, a scaler of 100 (scaler 88) will provide a 20 KHz output from the voltage controlled oscillator. This 20 KHz signal, now in phase lock with the subsurface clock, provides the synchronization between the subsurface and the surface systems. Thus, it can be seen that this system in accordance with the present invention extends the upper usable pulsing frequency while maintaining a fairly safe margin against random coincidence between the sync pulses and the signal pulses. The design criteria for phase-locked loop systems is well known and specially-designed integrated circuits are available for their implementation. See, for example, the *Phase-Locked Loop Data Book*, Second Edition, August, 1973, published by Motorola, Inc.

Figure 5:
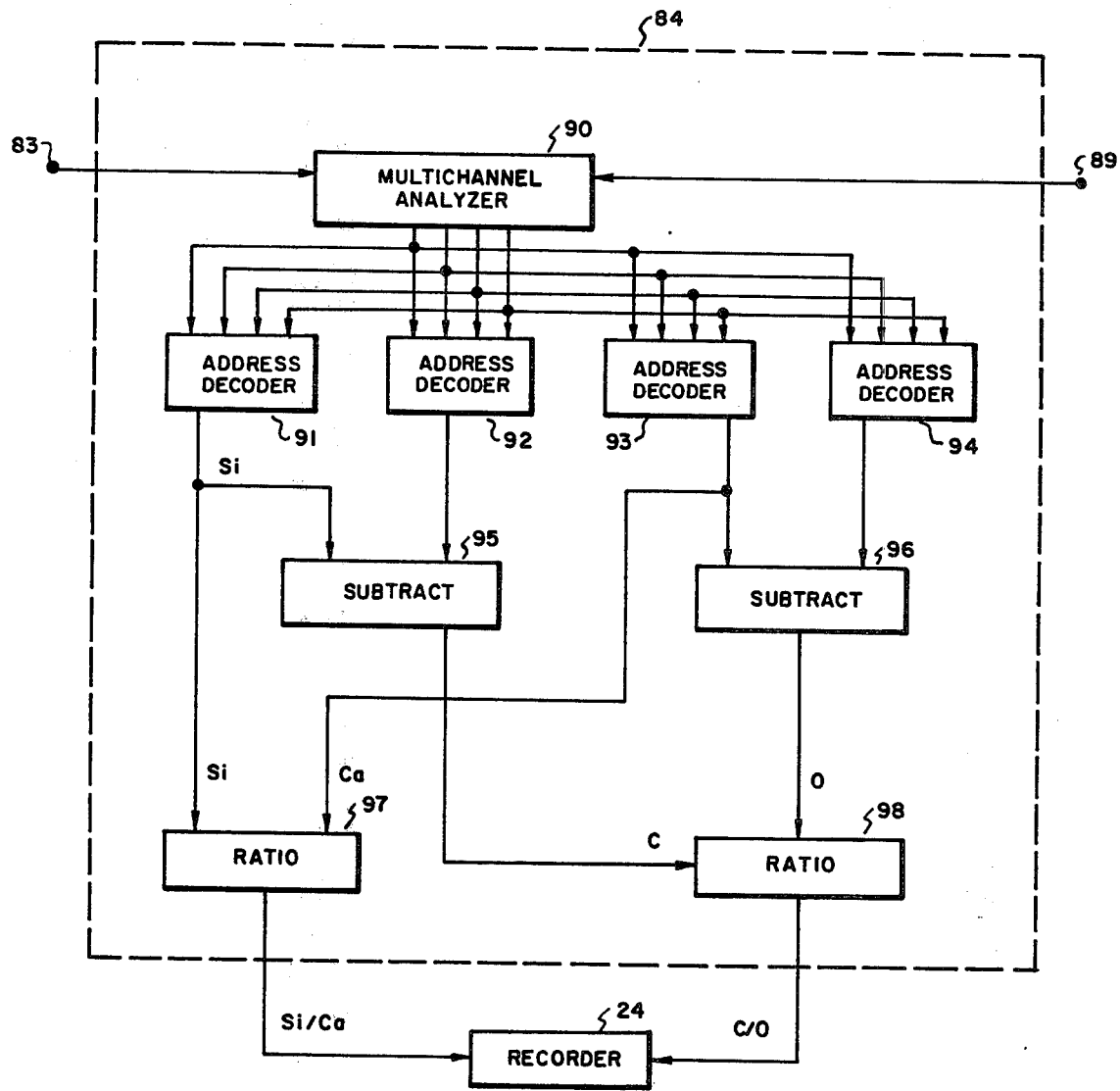
FIG. 5 is a block diagram showing in greater detail a portion of the surface circuitry illustrated in FIG. 4.

Referring now to FIG. 5, the surface timing circuitry 84 of FIG. 4 is shown in greater detail. The conductors 83 and 89, illustrated in FIG. 4, are coupled into a multichannel analyzer 90 having four outputs which are each connected into four address decoders identified by the numbers 91, 92, 93 and 94. The output of the address decoders 91 and 92 are coupled into a subtract circuit 95 and the outputs of the decoders 93 and 94 are coupled into a subtract circuit 96. The outputs of decoders 91 and 93 are also coupled into a ratio circuit 97 and the outputs of the subtract circuits 95 and 96 are coupled into a ratio circuit 98. The outputs of the ratio circuits 97 and 98 are recorded on the surface recorder 24. The operation of the multichannel analyzer and the address decoders is explained in greater detail in my U.S. Pat. No. 4,013,874 which issued on Mar. 22, 1977. In the preferred embodiment illustrated and described herein, the address decoder 91 and the address decoder 92 are each configured to measure pulses in the 3.2 to 4.6 Mev band. The address decoders 93 and 94 are configured to measure pulses in the 4.8 to 6.6 Mev band. As is well known, a carbon inelastic gamma ray has a peak at 4.43 Mev and a silicon capture gamma ray has an energy peak at 4.44 Mev. An oxygen inelastic gamma ray has an energy peak at 6.13 Mev and a calcium capture gamma ray has an energy peak at 6.41 Mev. Thus, by putting the inputs from the decoders 91 and 92 into the subtraction circuit, the capture time interval data is subtracted from the elastic time interval data to remove the capture background from the inelastic data. This results in the output of the subtraction circuit 95 being related to the carbon inelastic gamma rays with no capture background to disturb the data. In a similar manner, by putting the outputs from the decoders 93 and 94 into the subtraction circuit 96, the capture background is subtracted from the inelastic oxygen gamma rays to produce an output from the subtraction circuit 96 due to the inelastic oxygen gamma rays. The carbon output from subtraction circuit 95 and the oxygen output from the subtraction circuit 95 and the oxygen output from the subtraction circuit 96 are combined in the ratio circuit 98 to provide a carbon/oxygen ratio.

Since the capture interval used to correct the carbon inelastic data corresponds also to gamma rays from thermal neutron capture by silicon and the capture interval used to correct the oxygen inelastic data also is responsive to gamma rays from thermal neutron capture by calcium, a ratio is also struck by the ratio circuit 97 corresponding to the ratio of silicon to calcium. The silicon/calcium ratio output of the ratio circuit 97 and the carbon/oxygen ratio output of the ratio circuit 98 are both recorded by the recorder 24.

Figure 8:
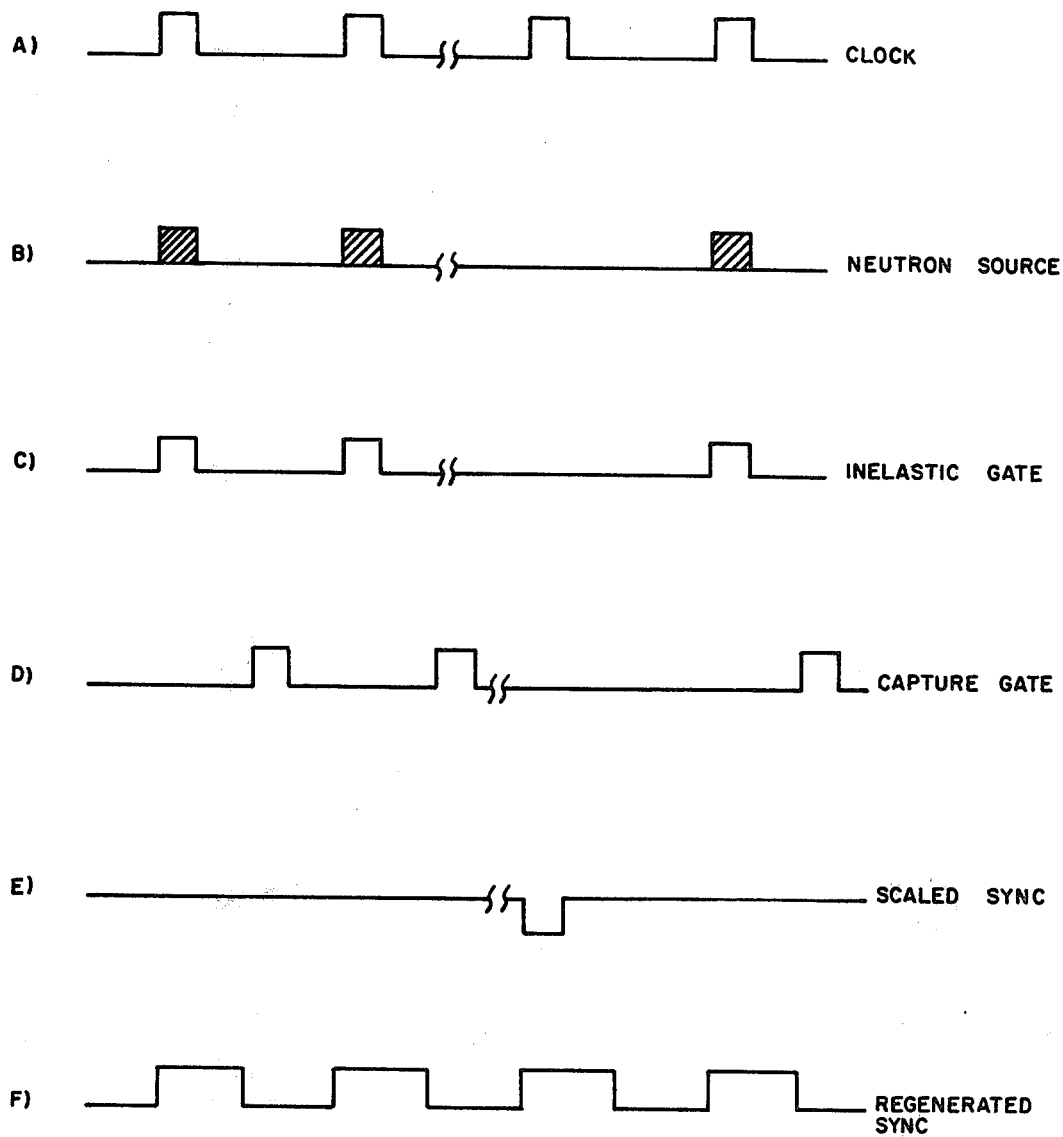

It should be appreciated that the circuitry of FIG. 5 is dependent upon having a sync signal coupled into the multichannel analyzer 90 by means of the conductor 89 to make the various address decoders accurate with respect to the detected pulses occurring in the subsurface instrument. The representative waveforms illustrated in FIG. 8 illustrate the relationship of the clock pulses in FIG. 8A to the generation of neutrons by the neutron source in FIG. 8B. The inelastic gate intervals of FIG. 8C correspond to the neutron source being turned on and the capture gate intervals are illustrated in FIG. 8D. It should be appreciated that the scaled sync pulse appearing in FIG. 8E occurs when the neutron source and the detection gates are all gated off as previously discussed. The regenerated sync signals appearing in FIG. 8F are square waves, for convenience, having a frequency corresponding to that of the clock frequency in the subsurface instrument. In the preferred embodiment, the multichannel analyzer 90 illustrated in FIG. 5 stores data in one portion of the memory when the regenerated sync 8F is high and in another portion when the sync is low.

Thus there has been described and illustrated herein a system in accordance with the present invention wherein synchronization between the surface and subsurface instrumentation is established by regenerating with a phase-locked loop the 20 KHz subsurface sync pulses which have been scaled to a lower frequency and transmitted over the logging cable. The 20 KHz signals from the phase-locked loop, in phase synchronization with the subsurface clock, controls the routing of the detector pulses in the surface signal processing system. The sync pulses are separated from the detector pulses in the sync separator and used as the reference signal for the phase-locked loop. The 20 KHz output from the phase-locked loop, the regenerated sync, controls the routing of the data signals. The detector pulses are fed into the multichannel pulse height analyzer system and the regenerated sync routes the pulses occurring in the inelastic interval into one section of the analyzer memory and the pulses occurring in the capture measure interval into another section. Thus, in the preferred embodiment of the invention illustrated and described herein, the high frequency system can be used in the subsurface instrument and the data utilized at the earth's surface without the inherent problems normally associated with frequencies of that magnitude. Obvious variations will occur to those skilled in the art. For example, if the sync pulses are generated from a very stable voltage reference and at an amplitude greater than the detector pulses, they may be also used as reference to correct for system gain changes caused by temperature, pressure and other effects which operate on the logging cable. It should also be apparent to those skilled in the art that this system can be used with cables having a better frequency response than the seven-conductor cable referred to hereinabove and extend the upper pulsing limits imposed by such cables. Furthermore, although the present invention contemplates the use of a sync pulse followed by a pair of detection gating intervals, other well logging systems can utilize the present invention, for example, a system wherein a single detection gating interval is used with each neutron burst. Such a system of scaling down the sync pulse and then regenerating it to its original frequency will also find utilization in other types of well logs.

The embodiments of the invention in which an exclusive property or privilege is claimed are defined as follows:

1. A method for logging the formations surrounding an earth borehole, comprising:
    pulsing a neutron generator in a well logging instrument within an earth borehole at a given frequency;
    generating sync pulses within said instrument at a second frequency scaled down from said given frequency;
    detecting radiation from the formations surrounding said borehole resulting from said neutron generator being pulsed;
    generating signal pulses functionally related to said detected radiation;
    transmitting said scaled down sync pulses and said signal pulses to the earth's surface;
    regenerating said scaled down sync pulses to sync pulses having the same frequency as the said given frequency; and
    utilizing said regenerated sync pulses and said signal pulses to provide an indication of at least one characteristic of said formations.

2. In a method for performing a radioactivity well logging survey of the formations surrounding an earth borehole, wherein a neutron generator within a borehole instrument is pulsed at a given frequency and signal pulses indicative of detected radiation are transmitted from said instrument to the earth's surface, the improvement comprising the steps of generating sync pulses at a frequency scaled down from said given frequency, transmitting said scaled down sync pulses to the earth's surface along with said signal pulses and regenerating said sync pulses to the same frequency as said given frequency.

3. The method according to claim 2, being characterized in addition thereto, by the step of disabling the neutron source each time a scaled down sync pulse is generated.

4. In a method for logging the formations surrounding an earth borehole, wherein electrical signals are generated in a well logging instrument functionally related to at least one characteristic of the formations in response to a clock having a given output frequency, the improvement comprising generating scaled down sync pulses having a frequency lower than said given frequency, transmitting said scaled down sync pulses and said electrical signals to the earth's surface, regenerating said scaled down sync signals to result in sync signals having a frequency the same as said given frequency, and combining said regenerated sync signals and said electrical signals to provide an indication of said at least one characteristic of the formations.

5. A radioactivity well logging apparatus, comprising:
    an elongated well logging instrument adapted to traverse an earth borehole;
    a neutron generator within said instrument;
    clock means within said instrument for pulsing said neutron generator at a given frequency;
    a sync generator within said instrument for generating first sync pulses at the same frequency as said given frequency;
    scaler means within said instrument and connected to said sync generator for generating scaled-down sync pulses having a frequency lower than said given frequency;
    detector means within said instrument for detecting radiation from the formations surrounding said borehole;
    signal generating means within said instrument for generating electrical signals functionally related to said detected radiation; and
    means for transmitting said scaled-down sync pulses and said electrical signals to the earth's surface.

6. The apparatus according to claim 5, including in addition thereto, means within said instrument for disabling said neutron generator upon the occurrence of each of said scaled-down sync pulses.

7. The apparatus according to claim 5, including in addition thereto, means at the earth's surface for regenerating said scaled-down sync pulses to thereby produce second sync pulses having the same frequency as said given frequency.

8. The apparatus according to claim 7, including in addition thereto, means at the earth's surface of using said second sync pulses and said electrical signals for providing an indication of at least one characteristic of the formations surrounding said earth borehole.

* * * * *